UNITED STATES PATENT OFFICE 2,551,795

PROCESS FOR MAKING CAMPHENE

Gastão Etzel, Philadelphia, Pa., assignor to E. I. du Pont de Nemours & Company, Wilmington, Del., a corporation of Delaware No Drawing. Application June 23, 1949, Serial No. 100,973

9 Claims. (Cl. 260—675.5)

This invention relates to an improved process for making camphene which is particularly useful for the manufacture of camphor.

It has been proposed to make camphene by heating pinene to temperatures of from about 100 to about 135° C. at atmospheric pressures in the presence of a titanium dioxide catalyst. Such process has required heating for 60 to 120 hours in order to complete the reaction and obtain an 80% yield of 46° C. F. P. camphene. Such slow rate of isomerization requires undesirable large amounts of equipment to produce any sizable amount of camphene. When it is attempted to speed the reaction by employing higher temperatures, such as reflux temperatures of 155° C. to 165° C., large amounts of other hydrocarbons are produced at the expense of the camphene, whereby the yield of camphene is materially reduced.

It is an object of the present invention to provide an improved process for making camphene. Another object is to provide a process for isomerizing pinene to camphene in the presence of a titanium dioxide catalyst, whereby the rate of isomerization is materially increased with a corresponding decrease in the time required for completion of the reaction. A further object is to advance the art. Still other objects will appear hereinafter.

The above and other objects may be accomplished in accordance with my invention which comprises boiling pinene under subatmospheric pressures of about 50 mm. to about 350 mm. absolute and at temperatures of about 80° C. to about 135° C. in the presence of about 0.5% to about 5% of a catalyst consisting essentially of amorphous hydrated titanium dioxide having a water content of about 2% to about 18% while continuously removing water from the reacting mixture. Usually, the reaction will be carried out under reflux, whereby the vaporized pinene, but not the water, will be continuously refluxed to the reaction mixture.

I have found that, by such procedure, the rate of isomerization can be materially increased so that the time for completion of the reaction will be decreased. At the same time, the yield of 46° C. F. P. camphene is not adversely affected, but high yields thereof are obtained. Therefore, the production of camphene from the equipment is greatly increased and the amount of equipment required to produce a desired amount of camphene can be considerably decreased resulting in a very substantial saving in equipment cost. The 46° C. F. P. camphene is a mixture having a freezing point (F. P.) of 46° C. and consisting almost entirely of camphene.

The temperatures and pressures are correlated so that a steady boiling of the pinene-catalyst mixture is maintained. The temperatures employed may vary from about 80° C. to about 135° C. and, preferably, from about 105° C. to about 120° C. to give the best balance between high yield and rapid reaction. The speed of the reaction will vary with the temperatures employed. Employing about 2% of the catalyst, the reaction will require about 40 hours at 80° C. and about 3 hours at 135° C. The yield of 46° C. F. P. camphene tends to be slightly below 80% at 135° C. and slightly above 85% at 80° C. If temperatures materially above 135° C. are employed, the yield of camphene is decreased to an objectionable extent.

The pressures employed will be dependent upon the temperatures and will be such as to cause the pinene to boil and, preferably, to maintain a steady boiling thereof. Such pressures will vary from about 50 mm. to about 350 mm. absolute. The approximate pressures required at representative temperatures are shown in the following table:

TABLE

| Temperatures | Pressures |
|---|---|
| °C. | mm. |
| 80 | 50 |
| 90 | 85 |
| 100 | 125 |
| 105 | 145 |
| 110 | 170 |
| 115 | 200 |
| 120 | 230 |
| 135 | 350 |

The process will usually be carried out in a vessel equipped with a reflux condenser for condensing and refluxing the pinene vapors to the reaction mixture. The reflux condenser may be provided with a separator for separating condensed water and preventing the return thereof to the reaction vessel. However, the reflux condenser may be operated so as to condense only the pinene vapors while permitting the water vapors to escape through the vacuum line. Equipment of this character and its operation are well known to the art.

The catalyst, which is to be employed in the process of my invention, consists essentially of amorphous hydrated titanium dioxide having a water content of about 2% to about 18% and, preferably, from about 8% to about 18%. These amounts of water are total amounts and include water of hydration, as well as uncombined water. Usually, the major proportion of the water will be water of hydration. It is essential that the titanium dioxide be in amorphous form as determined by X-ray diffraction. When the titanium dioxide is in the crystalline form, such as the rutile or anatase modifications, it is inactive and does not act as a catalyst in this process. A representative method of preparing the catalyst is shown in Example I. When the catalyst is air-dried, it will contain about 13% to about 18% water. This amount of water may be decreased to about 8.7% by heating at 100° C. at atmospheric pressures, or at temperatures of 50° C. to 100° C. under vacuum, which 8.7% of water is substantially all water of hydration. The amount of water may be further reduced to about 2% by heating at temperatures up to about 300° C., without seriously affecting the activity of the catalyst. However, if the amount of water is reduced to 1% or less, the catalyst becomes practically inactive, and heating to substantially above 300° C. tends to change the catalyst to the inactive anatase form.

The amount of catalyst employed will usually range from about 0.5% to about 5% by weight based on the alpha-pinene and, preferably, from about 1.5% to about 5%. In general, the rate of isomerization will vary substantially in proportion to the amount of catalyst, doubling the amount of catalyst approximately doubles the rate of isomerization. Less than about 0.5% of catalyst usually results in an impractically slow rate of isomerization. About 5% of catalyst is the practical upper limit and gives a reaction time of about 8 hours at 85° C. Materially larger amounts of catalyst tend to produce undesirable polymerization as a side reaction, cause inconveniently rapid heat evolution and are uneconomical.

In order to more clearly illustrate my invention, preferred modes of carrying the same into effect and the advantageous results to be obtained thereby, the following examples are given:

EXAMPLE I

Preparation of the titanium catalyst

Anatase "C" cake, which is a titanium dioxide paste containing about 5% titanium oxysulfate and about 25% of the dioxide, was partially (about 35%) converted to sodium titanate by heating at reflux with an excess of 30% sodium hydroxide. The resultant solid, containing sodium titanate, was then washed with water to remove most of the excess alkali, and slurred with water which slurry was then acidified to a pH of 4 with formic acid. The titanium dioxide was then washed essentially free of formic acid and filtered. The filter cake was dried under vacuum of about 25 inches of mercury at approximately 50° C. This dried solid contained about 90% amorphous titanium dioxide and 10% water, including about 8.7% water of hydration. After grinding, it was ready for use. Part of these components may be present as titanic acid.

Titanium tetrachloride or calcined titanium dioxide may be used in place of the anatase "C" cake, converted to sodium titanate and processed to active titanium dioxide catalyst by the same procedure as outlined above.

EXAMPLE II

Approximately 5 parts of the amorphous hydrated titanium dioxide, obtained in Example I, and 1000 parts of commercial alpha-pinene were heated for 8 hours at 105° C. under 145 mm. pressure, the necessary vacuum to maintain a steady reflux. After 8 hours, the temperature was increased to 115° C. and the vacuum changed to 200 mm. to maintain the same reflux. After 1 to 6 hours heating at this higher temperature, the isomerization was complete. Fractional distillation of the reaction mixture at 380 mm. resulted in an 80% yield of 46° C. F. P. camphene (very nearly pure camphene melting at 46° C.), along with about 16% of higher boiling hydrocarbons and about 4% of diterpenes.

When the isomerization was carried out at the same temperatures without the use of vacuum, the reaction required from 15 to 30 hours. At higher temperatures, the isomerization time is decreased but the reaction product contains less camphene and a higher percent of diterpenes.

EXAMPLE III

One hundred parts of pinene and two parts of dried and ground amorphous hydrated titanium dioxide catalyst (containing about 8% water) were charged into a triple neck vessel. The vessel was equipped with thermometer, stirrer and water cooled reflux condenser to the top of which was attached a vacuum line. A separator was provided at the bottom of the condenser for preventing the condensed water from returning to the reaction vessel. The pressure was reduced to 200 mm. absolute, and the mixture in the vessel was agitated and refluxed at a temperature of 115° C. until the pinene was completely isomerized. This state was reached when the freezing point of a sample of the reaction mass reached 0° C. The reaction product was then cooled, the catalyst removed by filtration and the camphene separated from the crude mixture by fractional distillation. The average reaction time on a total of four runs was seven hours and the composition of the crude camphene was 80% of 46° C. F. P. camphene, 17.6% terpene B hydrocarbons and 2.4% polymerized terpenes.

EXAMPLE IV

A series of four runs were made for comparison with Example III, using the same ratio of materials and same temperature 115° C., but the reaction was carried out at atmospheric pressure. In these runs, the reaction mixture was not refluxing since the temperature of 115° C. is considerably below the boiling temperature (155–160° C.) of pinene at atmospheric pressure. The average reaction time was ten hours and 30 minutes to complete the isomerization of the pinene and the composition of the crude camphene was 80% of 46° C. F. P. camphene, 17% terpene B hydrocarbons and 3% of polymerized terpenes.

The comparison of the runs, made at subatmospheric pressure with reflux and at atmospheric pressure with no reflux, shows a 33% decrease in the rate of isomerization at atmospheric pressure. The camphene yield is not effected by the change in pressures.

It will be understood that the preceding examples are given for illustrative purposes solely and that my invention is not to be limited to the specific embodiments disclosed therein. Many variations and modifications in the modes of carrying out the process, in the temperatures, pressures and other conditions within the scope of my invention will be readily apparent to those skilled in the art.

From the preceding description, it will be apparent that I have provided a novel method for making camphene from pinene, whereby the rate of isomerization is materially increased with corresponding decrease in the time required to produce any desired amount of camphene. Thereby, the production of camphene from existing equipment may be greatly increased and less equipment is required for obtaining a desired production of camphene, resulting in very material savings in cost of equipment. It is thus apparent that my invention is quite important economically and constitutes a valuable advance and contribution to the art.

I claim:

1. The process of making camphene which comprises boiling pinene under subatmospheric pressures of about 50 mm. to about 350 mm. absolute and at temperatures of about 80° C. to about 135° C. in the presence of about 0.5% to about 5% of a catalyst consisting essentially of amorphous hydrated titanium dioxide having a water content of about 2% to about 18% while continuously removing water from the reacting mixture, and separating camphene from the reaction mixture.

2. The process of making camphene which comprises boiling pinene under subatmospheric pressures of about 50 mm. to about 350 mm. absolute and at temperatures of about 80° C. to about 135° C. in the presence of about 0.5% to about 5% of a catalyst consisting essentially of amorphous hydrated titanium dioxide having a water content of about 8% to about 18% while continuously removing water from the reacting mixture, and separating camphene from the reaction mixture.

3. The process of making camphene which comprises boiling pinene under subatmospheric pressures of about 50 mm. to about 350 mm. absolute and at temperatures of about 80° C. to about 135° C. in the presence of about 0.5% to about 5% of a catalyst consisting essentially of amorphous hydrated titanium dioxide having a water content of about 2% to about 18% while continuously refluxing pinene to the reacting mixture and removing water therefrom, and separating camphene from the reaction mixture.

4. The process of making camphene which comprises boiling pinene under subatmospheric pressures of about 50 mm. to about 350 mm. absolute and at temperatures of about 80° C. to about 135° C. in the presence of about 0.5% to about 5% of a catalyst consisting essentially of amorphous hydrated titanium dioxide having a water content of about 8% to about 18% while continuously refluxing pinene to the reacting mixture and removing water therefrom, and separating camphene from the reaction mixture.

5. The process of making camphene which comprises boiling pinene under subatmospheric pressures of about 145 mm. to about 230 mm. absolute and at temperatures of about 105° C. to about 120° C. in the presence of about 0.5% to about 5% of a catalyst consisting essentially of amorphous hydrated titanium dioxide having a water content of about 8% to about 18% while continuously refluxing pinene to the reacting mixture and removing water therefrom, and separating camphene from the reaction mixture.

6. The process of making camphene which comprises boiling pinene under subatmospheric pressure of about 200 mm. and at a temperature of about 115° C. in the presence of about 0.5% to about 5% of a catalyst consisting essentially of amorphous hydrated titanium dioxide having a water content of about 8% to about 18% while continuously refluxing pinene to the reacting mixture and removing water therefrom, and separating camphene from the reaction mixture.

7. The process of making camphene which comprises boiling pinene under subatmospheric pressures of about 50 mm. to about 350 mm. absolute and at temperatures of about 80° C. to about 135° C. in the presence of about 1.5% to about 5% of a catalyst consisting essentially of amorphous hydrated titanium dioxide having a water content of about 8% to about 18% while continuously refluxing pinene to the reacting mixture and removing water therefrom, and separating camphene from the reaction mixture.

8. The process of making camphene which comprises boiling pinene under subatmospheric pressures of about 145 mm. to about 230 mm. absolute and at temperatures of about 105° C. to about 120° C. in the presence of about 1.5% to about 5% of a catalyst consisting essentially of amorphous hydrated titanium dioxide having a water content of about 8% to about 18% while continuously refluxing pinene to the reacting mixture and removing water therefrom, and separating camphene from the reaction mixture.

9. The process of making camphene which comprises boiling pinene under subatmospheric pressure of about 200 mm. and at a temperature of about 115° C. in the presence of about 1.5% to about 5% of a catalyst consisting essentially of amorphous hydrated titanium dioxide having a water content of about 8% to about 18% while continuously refluxing pinene to the reacting mixture and removing water therefrom, and separating camphene from the reaction mixture.

GASTÃO ETZEL.

REFERENCES CITED

The following references are of record in the file of this patent:

UNITED STATES PATENTS

| Number | Name | Date |
| --- | --- | --- |
| 1,967,430 | Rebner | July 24, 1934 |
| 2,129,323 | Henke et al. | Sept. 6, 1938 |
| 2,318,391 | Henke et al. | May 4, 1943 |
| 2,393,894 | Farinacci et al. | Jan. 29, 1946 |